United States Patent
Bhardwaj et al.

(10) Patent No.: US 11,011,976 B2
(45) Date of Patent: *May 18, 2021

(54) TRANSIENT CONTROL FOR POWER FACTOR CORRECTION

(71) Applicant: TEXAS INSTRUMENTS INCORPORATED, Dallas, TX (US)

(72) Inventors: Manish Bhardwaj, Sugarland, TX (US); Shamim Choudhury, Katy, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/846,494

(22) Filed: Apr. 13, 2020

(65) Prior Publication Data
US 2020/0313548 A1    Oct. 1, 2020

Related U.S. Application Data

(63) Continuation of application No. 15/879,360, filed on Jan. 24, 2018, now Pat. No. 10,622,886.

(60) Provisional application No. 62/564,310, filed on Sep. 28, 2017.

(51) Int. Cl.
*H02M 1/42* (2007.01)
*H02M 7/217* (2006.01)

(52) U.S. Cl.
CPC ........... *H02M 1/4233* (2013.01); *H02M 1/42* (2013.01); *H02M 1/4208* (2013.01); *H02M 7/217* (2013.01)

(58) Field of Classification Search
CPC .... H02M 1/42; H02M 1/4208; H02M 1/4233; H02M 7/217
See application file for complete search history.

(56) References Cited

U.S. PATENT DOCUMENTS

| | | | |
|---|---|---|---|
| 10,622,886 B2 * | 4/2020 | Bhardwaj | ........... H02M 1/4233 |
| 2017/0130699 A1 | 5/2017 | Achilles et al. | |
| 2018/0191273 A1 | 7/2018 | Banfi et al. | |

* cited by examiner

*Primary Examiner* — Rafael O De Leon Domenech
(74) *Attorney, Agent, or Firm* — Brian D. Graham; Charles A. Brill; Frank D. Cimino

(57) ABSTRACT

A drive circuit includes a transient detector that includes a detector input to receive a loop error signal from a phased locked loop (PLL) and generates a transient detected output signal if a transient is detected in an alternating current (AC) input voltage. A controller includes a controller input to receive the transient detected output signal from the transient detector and a feedback input to sense the AC input voltage provided to a bridge circuit. The controller is configured to apply a PLL angle output signal from the PLL to control switch output signals to the bridge circuit if the transient detected output signal is not generated and configured to apply the AC input voltage sensed from the feedback input to control the switch output signals to the bridge circuit if the transient detected output signal is generated.

20 Claims, 4 Drawing Sheets

TRANSIENT CONTROL FOR POWER FACTOR CORRECTION

CROSS-REFERENCE TO RELATED APPLICATION

This application is a continuation of U.S. patent application Ser. No. 15/879,360, filed on Jan. 24, 2018, which claims the benefit of U.S. Provisional Patent Application 62/564,310, filed on Sep. 28, 2017, each of which is incorporated by reference herein in its entirety.

TECHNICAL FIELD

This disclosure relates to electrical circuits, and more particularly to a drive circuit that changes its control output to a bridge circuit if transient conditions are detected.

BACKGROUND

Power factor Correction (PFC) may be defined as the ratio of real power to apparent power, and expressed as: power factor (PF)=Real Power/Apparent Power, where Real Power is expressed in Watts, while Apparent Power is expressed in volt-amperes (VA). In this expression, the real power is determined as the average of the instantaneous product of current and voltage across a phase or cycle, while the apparent power is deemed as the RMS value of current times the voltage. This suggests that when current and voltage counterparts are sinusoidal and in phase with each other, the resultant power factor is 1.0 which is deemed to be the ideal condition. A switch mode power supply (SMPS) is often used to efficiently convert an alternating current (AC) input voltage to a direct current (DC) output voltage. In many cases, power factor is a desirable parameter to control in SMPS design in order to provide power as efficiently as possible.

SUMMARY

This disclosure relates to a drive circuit that changes its control output to a bridge circuit if transient conditions are detected. In one example, a drive circuit includes a transient detector that includes a detector input to receive a loop error signal from a phased locked loop (PLL) and generates a transient detected output signal if a transient is detected in an alternating current (AC) input voltage. A controller includes a controller input to receive the transient detected output signal from the transient detector and a feedback input to sense an alternating current (AC) input voltage provided to a bridge circuit. The controller is configured to apply a PLL angle output signal from the PLL to control switch output signals to the bridge circuit if the transient detected output signal is not generated and configured to apply the AC input voltage sensed from the feedback input to control the switch output signals to the bridge circuit if the transient detected output signal is generated.

In another example, a system includes a bridge circuit to rectify an alternating current (AC) input voltage into a direct current (DC) output voltage in response to switch output signals. The system includes a phased locked loop (PLL) that includes a PLL input that receives the AC input voltage and generates a PLL angle output signal that represents the frequency of the AC input voltage and a loop error signal that represents a phase error between the AC input voltage and a locked PLL angle of the PLL. A transient detector in the system includes a detector input to receive the loop error signal from the PLL. The transient detector compares the loop error signal to a threshold and generates a transient detected output signal if the loop error signal exceeds the threshold. A controller in the system includes a controller input to receive the transient detected output signal from the transient detector and a feedback input to sense the AC input voltage that is provided to the bridge circuit. The controller is configured to apply the PLL angle output signal to control the switch output signals to the bridge circuit if the transient detected output signal is not generated and configured to apply the AC input voltage sensed from the feedback input to control the switch output signals to the bridge circuit if the transient detected output signal is generated.

In yet another example, a method includes generating a phased locked loop (PLL) angle output signal that represents the frequency and phase of an alternating current (AC) input voltage. The method includes generating a loop error signal that represents a phase error between the AC input voltage and a locked PLL angle. The method includes generating a transient detected output signal if the loop error signal exceeds a threshold. The method includes applying the PLL angle output signal to control switch output signals to a bridge circuit if the transient detected output signal is not generated. The method includes applying a voltage sensed from the AC input voltage to control the switch output signals to the bridge circuit if the transient detected output signal is generated.

DETAILED DESCRIPTION

Figure 1:
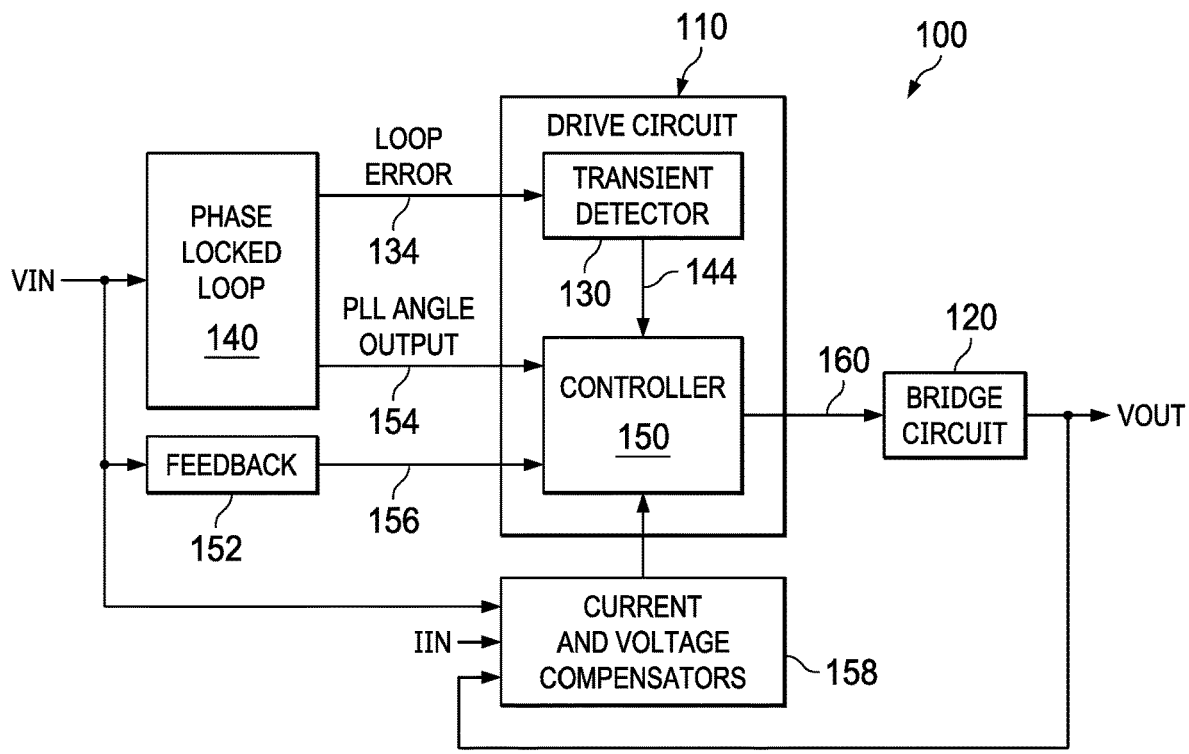
FIG. 1 illustrates an example block diagram of a system that includes a drive circuit that changes its control output to a bridge circuit if transient conditions are detected.

This disclosure relates to a drive circuit that changes its control output to a bridge circuit if transient conditions are detected. The drive circuit includes a transient detector to receive a loop error signal from a phased locked loop (PLL) and generates a transient detected output signal if a transient is detected in an alternating current (AC) input voltage. The PLL receives the AC input voltage and generates a PLL angle output signal that represents the frequency and the phase of the AC input voltage and the loop error signal that represents a phase error between the AC input voltage and a locked PLL angle of the PLL. A controller in the drive circuit receives the transient detected output signal from the transient detector and a feedback input to sense the AC input voltage provided to a bridge circuit. The bridge circuit rectifies the AC input voltage into a direct current (DC) output voltage in response to one or more switch output signals from the controller. In one example, the bridge circuit can be a totem pole bridge having one or more totem pole branches having a high and low side switch to provide rectification in response to the switch output signals.

The controller can apply the PLL angle output signal from the PLL to control switch output signals to the bridge circuit if the transient detected output signal is not generated. Thus, under steady state, the controller employs the PLL angle output signal to control the timing of the switch output signals, where the PLL angle output signal represents the input AC voltage phase. The PLL angle output signal is filtered and hence is able to provide accurate AC voltage phase under noisy and distorted input voltage conditions. This increases the noise immunity of the system. Under transient conditions however where a transient is detected in the AC input voltage, the controller dynamically changes its steady state operations and applies the AC input voltage sensed from the feedback input to control the switch output signals to the bridge circuit if the transient detected output signal is generated by the transient detector. By controlling bridge switch operations in this bifurcated manner (e.g., steady state versus transient condition), power factor correction performance is increased over current systems as more robust operation is possible under noise prone conditions. The drive circuit, system, and methods described herein mitigate output disturbances of current systems in the switch output signals of the controller during transients. This performance increase is achieved by accounting for transient conditions and overriding steady state control output values during transient conditions with another control value that is dynamically generated to compensate for the transient.

In another example, a system includes a bridge circuit to rectify an alternating current (AC) input voltage into a direct current (DC) output voltage in response to switch output signals. The system includes a phased locked loop (PLL) that includes a PLL input that receives the AC input voltage and generates a PLL angle output signal that represents the frequency and the phase of the AC input voltage and a loop error signal that represents a phase error between the AC input voltage and the locked PLL angle.

As used herein, the term "circuit" can include a collection of active and/or passive elements that perform a circuit function, such as an analog circuit or control circuit. Additionally or alternatively, for example, the term "circuit" can include an integrated circuit (IC) where all or some of the circuit elements are fabricated on a common substrate (e.g., semiconductor substrate, such as a die or chip).

FIG. 1 illustrates an example a system 100 that includes a drive circuit 110 that changes its control output to a bridge circuit 120 if transient conditions are detected. The drive circuit 110 includes a transient detector 130 that includes a detector input to receive a loop error signal 134 from a phased locked loop (PLL) 140 and generates a transient detected output signal 144 if a transient is detected in an alternating current (AC) input voltage shown as VIN. A controller 150 includes a controller input to receive the transient detected output signal 144 from the transient detector. The controller 150 includes a feedback input to sense the AC input voltage provided to the bridge circuit 120. The feedback input of the controller 150 can be driven via a feedback circuit shown as feedback 152 which can provide all or some fraction of the AC input voltage to the feedback input of the controller 150 via feedback signal 156.

Figure 4:
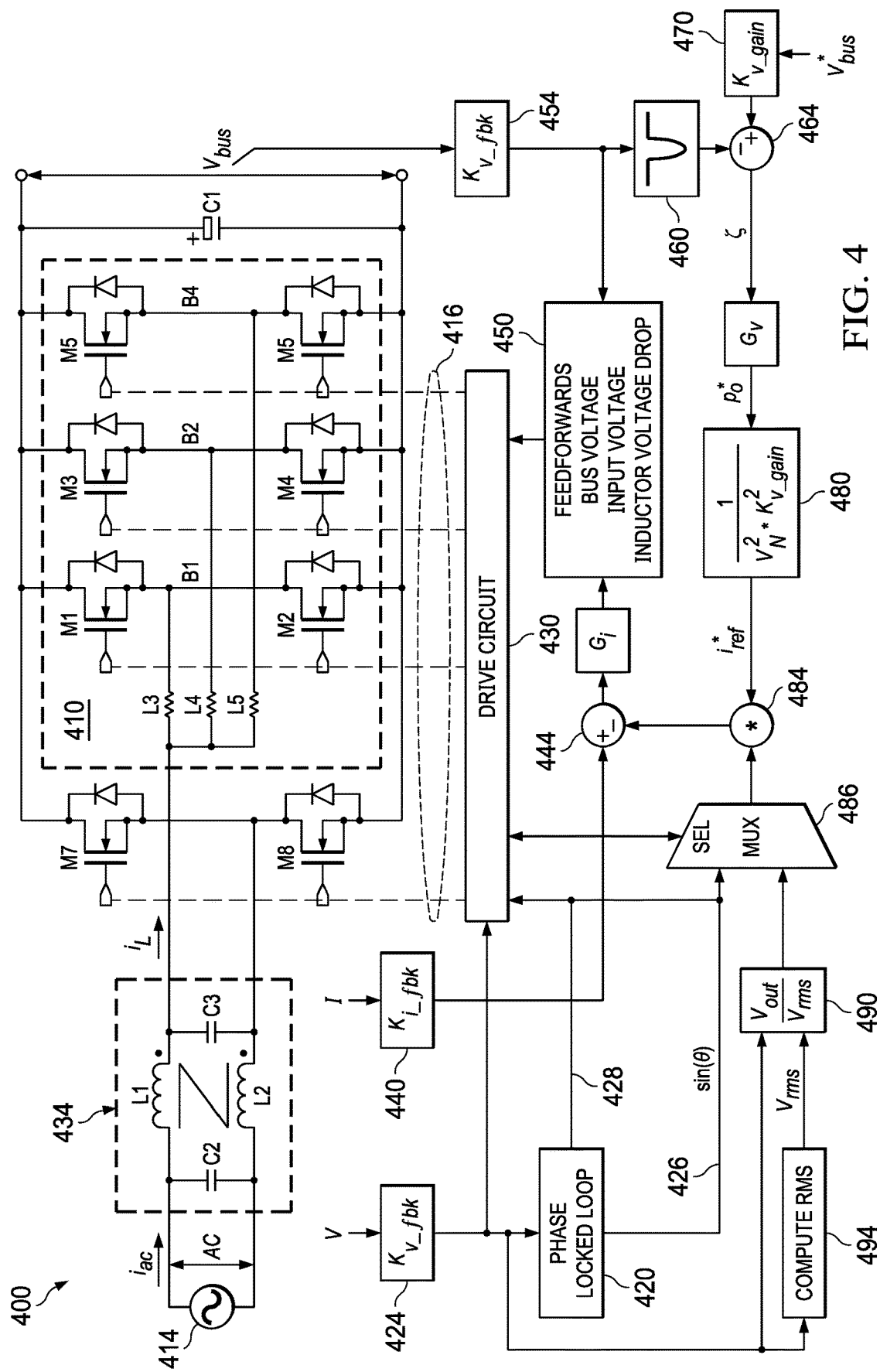
FIG. 4 illustrates an example circuit that changes its control output to a bridge circuit if transient conditions are detected.

The controller 150 can be configured to apply a PLL angle output signal 154 from the PLL 140 to control switch output signals 160 to the bridge circuit 120 if the transient detected output signal 144 is not generated (e.g., under non-transient steady state conditions). The controller 150 can be configured to apply the AC input voltage sensed by the feedback circuit 152 and received from the feedback input to control the switch output signals 160 to the bridge circuit 120 if the transient detected output signal 144 is generated by the transient detector 130. As shown, the controller 150 also receives input from voltage and controller compensators 158 which receive inputs of VIN, VOUT and current input (IIN). The compensators 158 provide voltage and current compensation to the controller 150 in response to the changes detected in the input voltage VIN, current IIN, and output voltage VOUT. Examples of such compensators are illustrated in FIG. 4.

The transient detector 130 compares the loop error signal 134 to a threshold (e.g., voltage or digitized data value) and generates the transient detected output signal 144 if the loop error signal exceeds the threshold. The controller 150 can be implemented as a processor that executes instructions from a memory to control the switch output signals 160, implemented as a state machine, or implemented as a logic array (e.g., gate array), for example. In one example, the controller 150 uses the PLL angle output signal magnitude 154 as a grid angle value to control the switch output signals 160 to the bridge circuit 120 if the transient detected output signal 144 is not detected. As used herein, the term "loop error" refers to the phase error that is detected between the AC input voltage VIN, and the locked PLL phase value. It is used in the controller 150, to control power factor of the bridge circuit 120 by controlling the switches via the switch output signals 160.

In another example, the controller 150 receives the AC input voltage sensed from the feedback circuit 152 to control the switch output signals 160 and computes the AC input voltage divided by a root mean square (RMS) value of the AC input voltage as a grid angle value to control the switch output signals 160 to the bridge circuit 120 if the transient detected output signal 144 is detected. The bridge circuit 120 can be controlled via one or more of the switched output signals 160 of the controller 150. The bridge circuit 120 provides a rectified DC output voltage VOUT in response to the switched output signals 160 of the controller 150. In one example, the drive circuit 110 can be implemented on an integrated circuit substrate. In another example, the drive circuit 110, the bridge circuit 120, the PLL 140, and/or the feedback circuit 152 can be implemented on the integrated circuit substrate. In yet another example, the respective circuits of FIG. 1 could be configured as separate circuits of a control and drive system.

Figure 2:
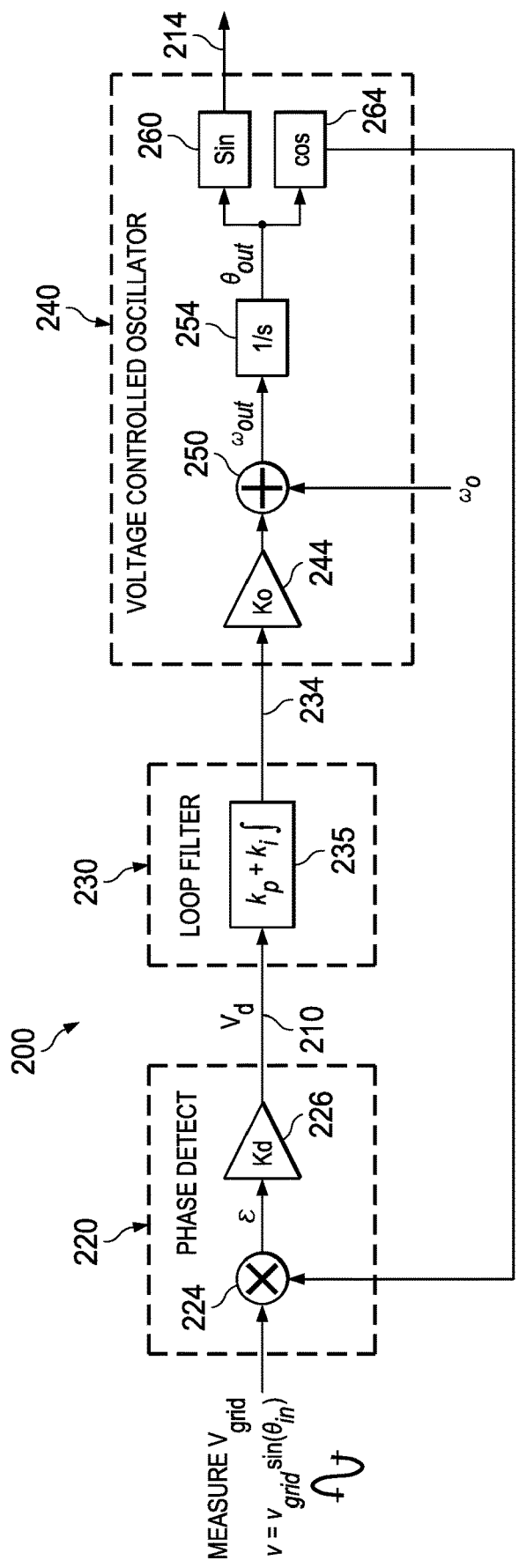
FIG. 2 illustrates an example of a phased locked loop (PLL) circuit that provides a loop error output signal and a PLL angle output signal.

FIG. 2 illustrates an example of a phased locked loop (PLL) circuit 200 provides a loop error signal 210 and a PLL angle output signal at 214. The PLL 200 includes a phase detector 220 that receives the AC input voltage and detects a phase error between the AC input voltage and the locked PLL angle. The phase detector 220 includes a mixer 224 and an amplifier 226 having a constant gain term Kd to amplify the output of the mixer. The mixer 224 mixes the AC input voltage which equals Vgrid*sin($\theta$in), where Vgrid is the voltage value of the standard power grid and sin($\theta$in) is the phase angle of the grid voltage at the input of the mixer 224. A loop filter 230 receives output Vd at 210, which is the loop error, from the phase detector 220 to generate a loop filter output signal 234. A loop filter function 235 that provides a combination of constant and integral terms to perform a filtering of the phase detector output/loop error input signal Vd. The loop filter output 234 drives the input of a voltage controlled oscillator (VCO) 240 that generates the PLL angle output signal 214 representing the frequency and the phase of the AC input voltage. The VCO 240 includes an amplifier 244 having a gain Ko that amplifies the loop output signal 234 and provides it to an adder 250. The adder 250 adds reference frequency ωo and produces output ωout which drives an integrator 254. The integrator 254 output θout is provided to a sine and cosine function block 260 and 264 respectively. Output from the sine function block 260 represents the sine of the PLL phase angle output 214 described herein. Output from the cosine function block 264 is feedback to the mixer 224 of the phase detector 220.

Figure 3:
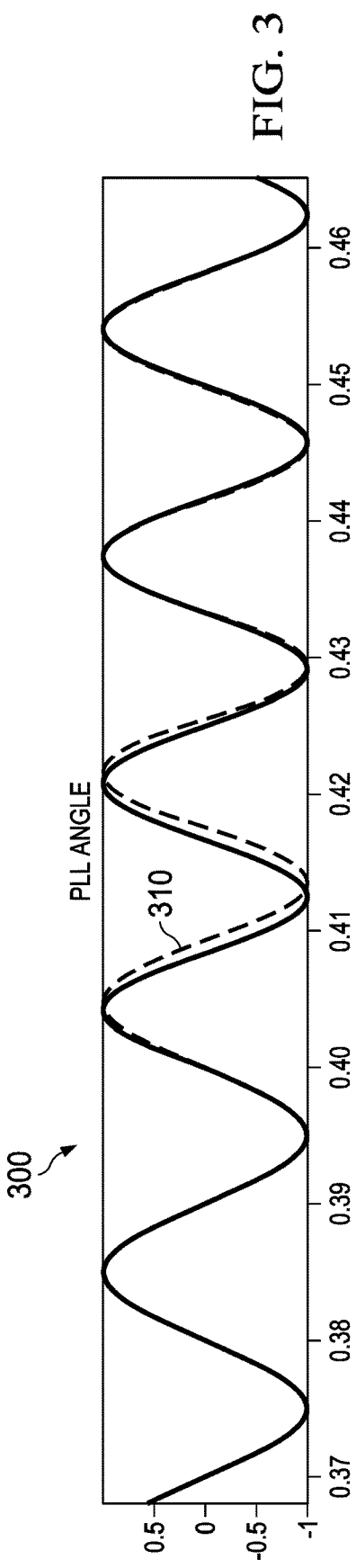
FIG. 3 illustrates an example signal diagram that depicts a transient condition that can be detected by a drive circuit to control output to a bridge circuit when the transient condition is detected.

FIG. 3 illustrates an example signal diagram 300 that depicts a transient condition that can be detected by a drive circuit to control output to a bridge circuit when the transient condition is detected. The vertical axis of the diagram 300 represents voltage and the horizontal axis represents phase angle degrees. As shown at 310 when a transient condition occurs of the AC input voltage occurs, the PLL output phase angle is disturbed from steady state for a few cycles of the AC input voltage. During these cycles, current systems would continue to use the PLL angle output for control which can result in incorrect drive of the bridge which can cause overcurrent condition and failure of the circuit to operate. The circuits, systems, and methods described herein detect the phase angle disturbance via the loop error signal described herein and change the controller output to represent the AC input voltage as the phase angle output during the disturbance. This performance increase is achieved by accounting for transient conditions and overriding steady state control output values during the transient conditions with another control value (e.g., AC input voltage substituted for the phase angle output) that is dynamically generated to compensate for the transient. This enables the system to use a more noise robust PLL angle during steady state conditions, which is the majority operation time of the circuit and thus making the system less susceptible to noise.

FIG. 4 illustrates an example circuit 400 (or system) that changes its control output to a bridge circuit if transient conditions are detected. The circuit 400 includes the bridge circuit 410 to rectify an alternating current (AC) input voltage 414 into a direct current (DC) output voltage Vbus in response to switch output signals 416, where Vbus can be filtered by bulk capacitor C1. The circuit includes a phased locked loop (PLL) 420 that includes a PLL input that receives the AC input voltage via feedback circuit 424 and generates a PLL angle output signal 426 that represents the frequency and the phase of the AC input voltage. The PLL also generates a loop error signal 428 that represents a phase error between the phase of the AC input voltage 414 and the locked PLL angle. A transient detector (not shown) in a drive circuit 430 includes a detector input to receive the loop error signal 428 from the PLL 420. The transient detector compares the loop error signal 428 to a threshold and generates a transient detected output signal if the loop error signal exceeds the threshold. A controller (not shown) in the drive circuit 430 includes a controller input to receive the transient detected output signal from the transient detector and a feedback input to sense the AC input voltage that is provided to the bridge circuit 410. In this example, the feedback circuit 424 provides the feedback according to a constant Kv_fbk. The controller can be configured to apply the PLL angle output signal 426 to control the switch output signals 416 to the bridge circuit 410 if the transient detected output signal is not generated and configured to apply the AC input voltage sensed from the feedback input to control the switch output signals to the bridge circuit if the transient detected output signal is generated.

In one example, the bridge circuit 410 can include one or more rectifier branches shown as B1, B2, and B3 in this example to perform rectification of VIN 414. Each of the rectifier branches B1, B2, and B3 includes a high side and a low side switch operating as a totem pole shown as switches M1/M2, M3/M4, and M5/M6 respectively that are controlled by the switch output signals 416 from the controller in the drive circuit 416 to provide the rectified DC output voltage Vbus. The bridge circuit 410 can also include a low frequency high side and low side switch M7 and M8 that are controlled by the controller to provide a return conduction path for the respective high side and low side switch of the respective rectifier branches B1, B2, and B3 that is conducting in response to the switch output signals 416 from the controller. The low frequency switches operate at the grid frequency of 50 or 60 Hertz (Hz) depending on location and the rectifier branch switches can switch at higher frequencies (e.g., 100 KHz).

Other aspects of the circuit 400 include a filter 434 to filter AC line noise from the bridge circuit 410 and/or to filter switch frequencies of the bridge circuit 410 from feeding back to the power grid. The filter 434 can include inductors L1 and L2 in series with the AC input voltage lines having parallel capacitors C2 and C3 across the respective lines on either side of L1 and L2. Output from the filter 434 drives inductors L3, L4, and L5 which supply AC power to the bridge circuit 410. Current can be fed back through feedback circuit 440 which drives a subtraction circuit 444 which in turn drives a gain block Gi which can be configured as a proportional, integral, and/or derivative controller (PID). Output from the gain block Gi drives a feed-forward circuit 450 which drives the drive circuit 430 and provides feed-forward voltages representing the Vbus voltage, the AC input voltage, and the inductor voltage drops across L1 and L2.

Output from Vbus can be sampled via feedback circuit 454 having an output that feeds both the feed-forward circuit 450 and a notch filter 460. Output from the notch filter 460 drives a subtraction circuit 464 which combines with feedback from Vbus via feedback circuit 470. Output from the subtraction circuit drives another gain circuit Gv which in turn drives a conversion circuit 480 (e.g., convert power to current). The conversion circuit drives a multiplier 484 which also receives input from multiplexer 486. Output from the multiplier 484 is provided as an input to subtraction circuit 444. The multiplexer can multiplex between the PLL angle output signal 426 and an output from a divider 490 which computes the term Vac/Vrms. The divider 490 is driven from the feedback circuit 424 representing Vac and from a compute RMS circuit 494. The term Vac/Vrms is used by the drive circuit 430 to control the switch output signals 416 during transient conditions whereas the PLL angle output signal 426 is used by the drive circuit 430 during steady state conditions.

Figure 5:
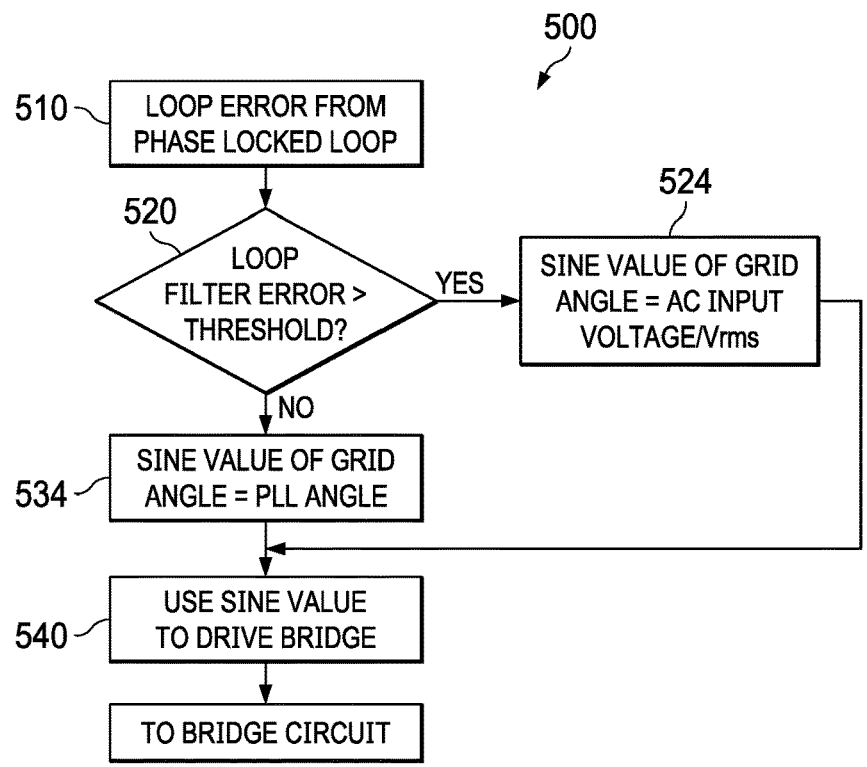
FIG. 5 illustrates an example method to detect a transient condition and alter a control output to a bridge circuit if the transient condition is detected.
Figure 6:
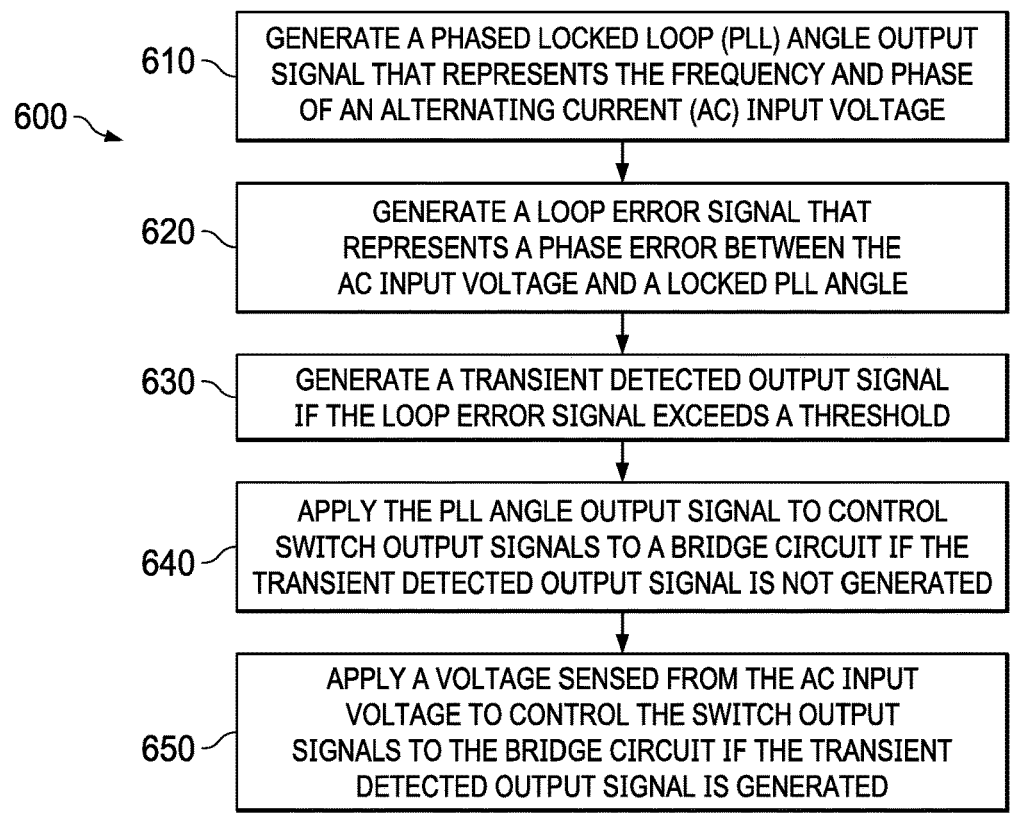
FIG. 6 illustrates an example method to generate phased locked loop angle output signals and loop error signals to detect a transient condition and apply a different control output to a bridge circuit if the transient condition is detected.

In view of the foregoing structural and functional features described above, example methods will be better appreciated with reference to FIGS. 5 and 6. While, for purposes of simplicity of explanation, the methods are shown and described as executing serially, it is to be understood and appreciated that the methods are not limited by the illustrated order, as parts of the methods could occur in different orders and/or concurrently from that shown and described herein. Such methods can be executed by various hardware circuits and components configured to execute machine readable instructions stored in memory and executable by an integrated circuit or a processor, for example.

FIG. 5 illustrates an example method 500 to detect a transient condition and alter a control output to a bridge circuit if the transient condition is detected. At 510, the method 500 receives a loop error signal from a phased lock loop (e.g., from input of loop filter 230 shown in FIG. 2). At 520, a determination is made as to whether or not the loop error received at 510 is greater than a threshold (e.g., analog or digital value). If the loop error is determined below the threshold at 520 indicating steady state conditions, the method proceeds to 534 and provides the PLL angle output as the sine value of the grid angle which is then used at 540 to drive the bridge circuit via the switch output signals described herein. If the loop error signal is above the threshold at 520 indicating a transient condition is detected, the method 500 proceeds to 524 which alters the steady state PLL angle output and substitutes the AC input voltage/ VRMS value of the AC input as the sine value of the grid angle provided to the controller to drive the bridge circuit at 540.

FIG. 6 illustrates an example method 600 to generate phased locked loop angle output signals and loop error signals to detect a transient condition and apply a different control output to a bridge circuit if the transient condition is detected. At 610, the method 600 includes generating a phased locked loop (PLL) angle output signal that represents the frequency and phase of an alternating current (AC) input voltage. At 620, the method 600 includes generating a loop error signal that represents a phase error between the AC input voltage and a locked PLL angle. At 630, the method 600 includes generating a transient detected output signal if the loop error signal exceeds a threshold. At 640, the method 600 includes applying the PLL angle output signal to control switch output signals to a bridge circuit if the transient detected output signal is not generated. At 650, the method 600 includes applying a voltage sensed from the AC input voltage to control the switch output signals to the bridge circuit if the transient detected output signal is generated. Although not shown, the method 600 can also include computing the AC input voltage divided by a root mean square (RMS) value of the AC input voltage as a grid angle value to control the switch output signals to the bridge circuit if the transient detected output signal is detected. Also, the method 600 includes providing the PLL angle output signal magnitude as the grid angle value to control the switch output signals to the bridge circuit if the transient detected output signal is not detected.

Figure 7:
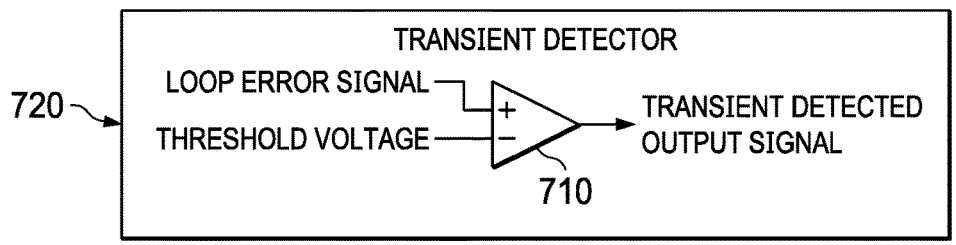
FIG. 7 illustrates an example of a comparator that is employed as a transient detector to detect transient conditions by monitoring a phased locked loop error signal.

FIG. 7 illustrates an example of a comparator 710 that is employed as a transient detector 720 to detect transient conditions by monitoring a phased locked loop error signal. As shown, the loop error signal is monitored via the positive input of the comparator 710 and compared to a threshold voltage at the negative input from the comparator. Output from the comparator 710 is the transient detected output signal and is in the true state (e.g., high) when the loop error signal exceeds the threshold voltage. Although not shown, the comparator may include feedback and/or filtering to tailor the response of the comparator 710 under noisy and/or other environmental conditions.

Figure 8:
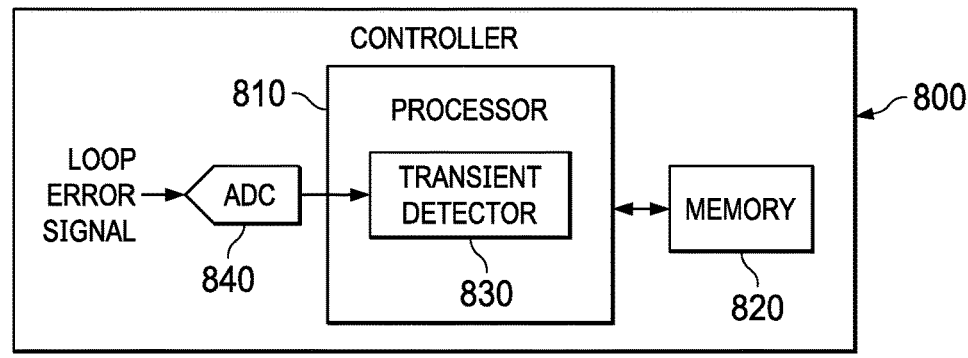
FIG. 8 illustrates a processor and memory operating as a controller having an internal digital comparator operating as a transient detector.

FIG. 8 illustrates a controller 800 that includes a processor 810 and memory 820 having machine readable instructions to operate the controller. In this example, the controller can have an internal digital comparator operating as a transient detector 830 which receives a digital value from analog to digital converter 840 representing the loop error voltage. The transient detector 830 can be integrated in the controller 830 and compares a digitized value of the loop error signal from the converter 840 to a threshold data value which can be a configurable parameter supplied to the controller (e.g., via user data input). In other examples, the controller 800 can be implemented as a state machine or implemented as a logic array.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A circuit comprising:
   a controller that includes:
      a first input configured to receive a transient detected signal;
      a second input configured to receive an alternating current (AC) signal;
      a third input configured to receive a phase locked loop (PLL) angle signal; and
      a set of outputs configured to provide switching signals for a bridge circuit, wherein the controller is configured to:
      in response to the transient detected signal not indicating a transient, control a timing of the switching signals based on the PLL angle signal and not on the AC signal; and
      in response to the transient detected signal indicating the transient, control the timing of the switching signals based on the AC signal and not on the PLL angle signal.

2. The circuit of claim 1 further comprising a transient detector that includes:
   an input configured to receive a PLL error signal; and
   an output coupled to the first input of the controller to provide the transient detected signal, wherein the transient detector is configured to provide the transient detected signal based on a comparison of the PLL error signal to a threshold.

3. The circuit of claim 1 further comprising a PLL coupled to the controller that includes:
   an input configured to receive an AC input voltage;
   an output coupled to the third input of the controller to provide the PLL angle signal;
   an oscillator coupled to the output of the PLL to provide the PLL angle signal; and
   a phase detector coupled to the input of the PLL and to the oscillator and configured to compare the AC input voltage to a signal of the oscillator to determine an PLL error signal, wherein the transient detected signal is based on the PLL error signal.

4. The circuit of claim 1, wherein the controller is configured to:

determine a root mean square value of the AC signal;
divide a voltage of the AC signal by the root mean square value of the AC signal; and
in response to the transient detected signal indicating the transient, control the timing of the switching signals based on the voltage of the AC signal divided by the root mean square value of the AC signal.

5. The circuit of claim 1 further comprising the bridge circuit, wherein:
the bridge circuit includes:
an input;
a high-side output and a low-side output configured to provide an output voltage between the high-side output and the low-side output;
a set of branches coupled between the high-side output and the low-side output, wherein each branch of the set of branches includes a high-side transistor coupled between a branch node and the high-side output and a low-side transistor coupled between the branch node and the low-side output; and
a set of inductors each coupled between the input of the bridge circuit and the branch node of a respective branch of the set of branches; and
the set of outputs of the controller are configured to couple to gates of the high-side transistors and the low-side transistors.

6. The circuit of claim 5, wherein:
the input of the bridge circuit is a first input; and
the bridge circuit includes:
a second input;
a return high-side transistor coupled between the second input and the high-side output; and
a return low-side transistor coupled between the second input and the low-side output.

7. The circuit of claim 6 further comprising a filter that includes:
a first input and a second input configured to receive an AC input;
a first output coupled to the first input of the bridge circuit; and
a second output coupled to the second input of the bridge circuit.

8. The circuit of claim 7, wherein the filter includes:
a first inductor coupled between the first input and the first output;
a second inductor coupled between the second input and the second output;
a first capacitor coupled between the first input and the second input; and
a second capacitor coupled between the first output and the second output.

9. The circuit of claim 1, wherein the AC signal is a feedback signal.

10. A circuit comprising:
a phase locked loop (PLL) that includes:
an input configured to receive an alternating current (AC) signal;
a first output configured to provide an angle signal; and
a second output configured to provide a phase error signal;
a transient detector that includes:
an input coupled to the second output of the PLL; and
an output configured to provide a transient detected signal based on the phase error signal; and
a controller that includes:
a first input coupled to the first output of the PLL to receive the angle signal;
a second input coupled to the output of the transient detector to receive the transient detected signal;
a third input configured to receive the AC signal; and
a set of outputs configured to provide switching signals for a bridge circuit, wherein the controller is configured to:
in response to the transient detected signal not indicating a transient, control a timing of the switching signals based on the angle signal instead of the AC signal; and
in response to the transient detected signal indicating the transient, control the timing of the switching signals based on the AC signal instead of the angle signal.

11. The circuit of claim 10, wherein the PLL includes:
an oscillator coupled to the first output of the PLL to provide the angle signal;
a phase detector coupled to the input of the PLL, to the oscillator, and to the second output of the PLL, and configured to:
compare the AC signal to a signal of the oscillator to determine the phase error signal; and
provide the phase error signal at the second output of the PLL.

12. The circuit of claim 10, wherein the transient detector is configured to compare the phase error signal to a threshold to determine the transient detected signal.

13. The circuit of claim 10, wherein the controller is configured to:
determine a root mean square value of the AC signal;
divide a voltage of the AC signal by the root mean square value of the AC signal; and
in response to the transient detected signal indicating the transient, control the timing of the switching signals based on the voltage of the AC signal divided by the root mean square value of the AC signal.

14. The circuit of claim 10 further comprising the bridge circuit, wherein:
the bridge circuit includes:
an input;
a high-side output and a low-side output configured to provide an output voltage between the high-side output and the low-side output;
a set of branches coupled between the high-side output and the low-side output, wherein each branch of the set of branches includes a high-side transistor coupled between a branch node and the high-side output and a low-side transistor coupled between the branch node and the low-side output; and
a set of inductors each coupled between the input of the bridge circuit and the branch node of a respective branch of the set of branches; and
the set of outputs of the controller are configured to couple to gates of the high-side transistors and the low-side transistors.

15. The circuit of claim 14, wherein:
the input of the bridge circuit is a first input; and
the bridge circuit includes:
a second input;
a return high-side transistor coupled between the second input and the high-side output; and
a return low-side transistor coupled between the second input and the low-side output.

16. The circuit of claim 15 further comprising a filter that includes:
a first input and a second input configured to receive an AC input;

a first output coupled to the first input of the bridge circuit; and a second output coupled to the second input of the bridge circuit.

17. A method comprising:

receiving an angle signal from an oscillator;

receiving a phase error signal associated with the angle signal from the oscillator;

receiving an alternating current (AC) signal;

determining whether the phase error signal exceeds a threshold;

when the phase error signal does not exceed a threshold, generating a set of switching signals for an alternating-current-to-direct-current (AC-to-DC) converter bridge having a timing based on the angle signal from the oscillator and not on the AC signal; and when the phase error signal exceeds the threshold, generating the set of switching signals having a timing based on the AC signal and not on the angle signal.

18. The method of claim 17, wherein the AC signal is a feedback signal of the AC-to-DC converter bridge.

19. The method of claim 17 further comprising controlling oscillation of the oscillator based on the AC signal such that the phase error signal represents a difference between the angle signal and the AC signal.

20. The method of claim 17 further comprising:

computing a root mean square of the AC signal;

dividing the root mean square of the AC signal by a voltage of the AC signal; and when the phase error signal exceeds the threshold, generating the set of switching signals having the timing further based on the voltage of the AC signal divided by the root mean square of the AC signal.

\* \* \* \* \*